May 20, 1958 H. E. VAUGHAN 2,835,741

MAGNETIC CORE SIGNAL GENERATOR

Filed Nov. 1, 1956 2 Sheets-Sheet 1

INVENTOR
H. E. VAUGHAN
BY Kenneth B Hamlin
ATTORNEY

May 20, 1958 H. E. VAUGHAN 2,835,741

MAGNETIC CORE SIGNAL GENERATOR

Filed Nov. 1, 1956 2 Sheets-Sheet 2

INVENTOR
H. E. VAUGHAN
BY Kenneth B. Hamlin
ATTORNEY

United States Patent Office 2,835,741

Patented May 20, 1958

2,835,741

MAGNETIC CORE SIGNAL GENERATOR

Henry E. Vaughan, Chatham, N. J., assignor to Bell Telephone Laboratories, Incorporated, New York, N. Y., a corporation of New York Application November 1, 1956, Serial No. 619,810

21 Claims. (Cl. 179—90)

Figure 1:
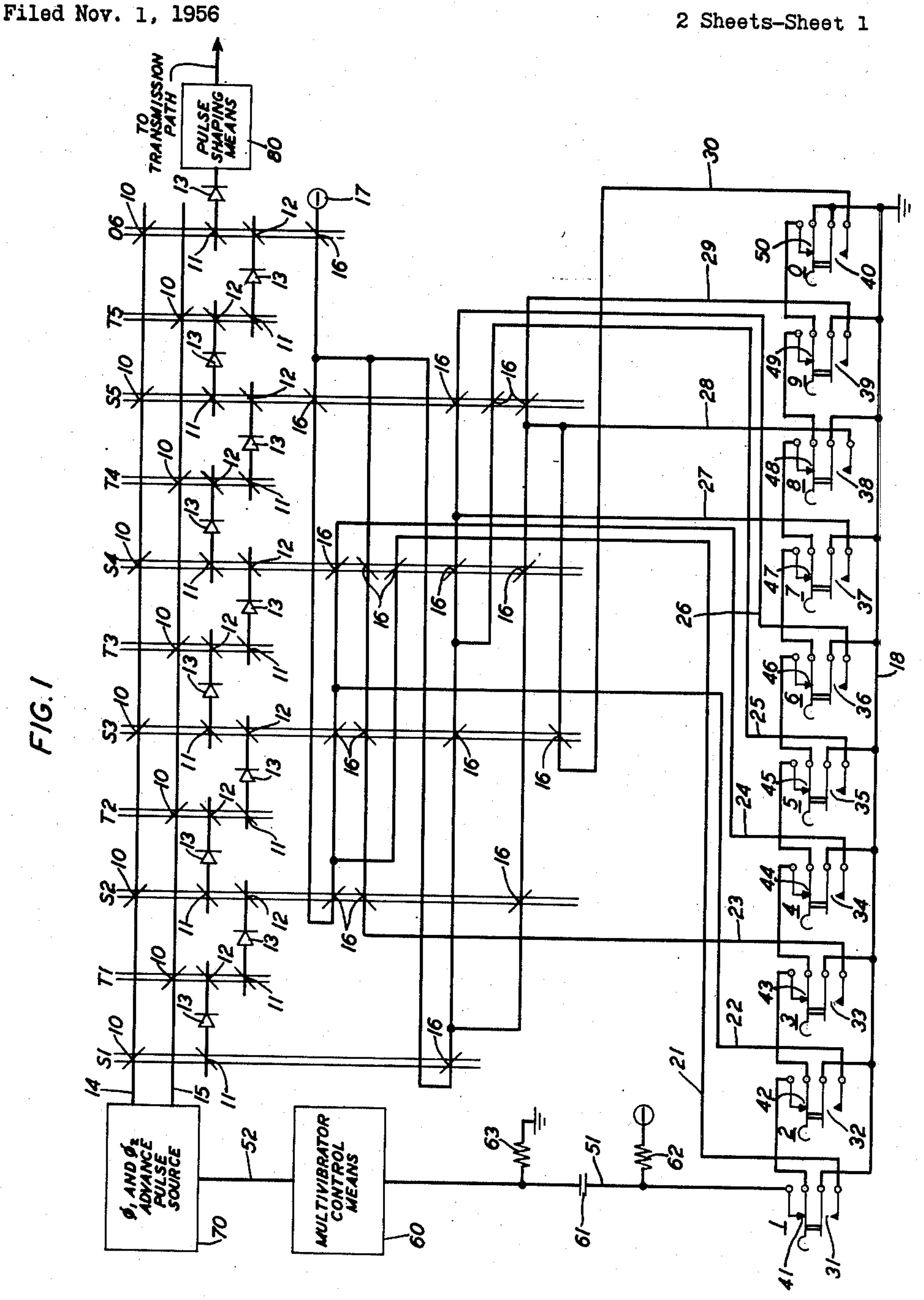

This invention relates to electrical signal generators and more particularly to signal generators adapted for use in telephone subscriber subsets. As there used, a signal generator is controlled by the subscriber to transmit coded series of electrical impulses representative of the directory designation of the distant subscriber substation with which a connection is desired.

The electrical impulses are presently generated in a well-known manner by periodically interrupting a closed direct-current circuit by means of impulsing springs in the telephone subset. The springs are controlled by the familiar finger controlled telephone dial which is operated in accordance with the digital information of the called line to produce a series of direct-current pulses corresponding to the particular digit dialed. The current pulses operate directly, or after intermediate registration and translation, to control automatic switches which finally establish the desired connection between the calling and called lines. The frequency of the current pulses is in the order of 10 impulses per second and this pulse rate has been found satisfactory to control most relatively slow moving mechanical switching means encountered in present automatic telephone systems.

The use of direct-current control pulses, however, imposes some limitation on the character of the circuits and circuit elements employable in the telephone system. Direct-current pulses require, for example, exclusively metallic transmission circuits which will pass the current and preclude the use, for example, of transformer coupling where such coupling might otherwise prove advantageous. In addition, because the pulses are generated mechanically and because the impulsing means are inherently subject to wear, maladjustment, and the like, another limitation is presented when it becomes necessary to substantially increase the pulse rate frequency. For both of these reasons present means for generating control pulses would be unsuited to automatic telephone systems in which the switching operations are controlled exclusively electronically. I have described, for example, such a telephone system with W. A. Malthaner in "An Experimental Electronically Controlled Automatic Switching System," Bell System Technical Journal, vol. 31, May 1952, at page 411. Although an impulse generator according to the present invention is not directly interchangeable with the impulse generating means there described, the system of the cited article will serve to illustrate the disadvantages of the well-known dial pulsing means relative to such a system. Further, the system referred to also illustrates the general character of electronic telephone systems with which the use of the present invention is contemplated.

One consideration necessitating a substantial increase in the control pulse rate frequency presented in the article referred to above is the necessity for decreasing the holding time of the system switching circuits. The shorter such a holding time the more calls such a circuit can complete in a given time duration and the fewer the common switching circuits required to handle the expected traffic. A pulse rate frequency considered to be optimum for, but not limiting of, the present invention, is considered to be in the order of 100 impulses per second. In the provision of a suitable impulse generator controlled by a telephone subscriber adaptable for use in an electronic telephone system as described, special factors such as the requirements of both the subscriber substation and the central office further are involved. Thus, in the article above cited a proposed subset impulse generating arrangement is described which requires a minimum amount of equipment at the central office for accepting the pulses generated. However, in that case the substation equipment of necessity would be relatively expensive and might prove economically unfeasible.

Accordingly, it is an object of this invention to generate coded impulses representative of called subscriber substation information in an automatic telephone system at a substantially higher rate without sacrifice of apparatus simplicity and economy.

Another object of this invention is to generate high-speed coded signals representative of called subscriber substation information in an automatic telephone system under the control of a calling subscriber, the signals being of a character requiring a minimum of central office equipment for their reception.

A further object of this invention is to generate high-speed coded signals representative of called subscriber substation information under a minimal control of the calling subscriber.

A feature of this invention is a plurality of magnetic cores having substationally rectangular hysteresis characteristics which are set in a particular condition of magnetic remanence by selected subscriber-operated keys in accordance with the coded called subscriber substation directory designation.

According to one aspect thereof, this invention utilizes a magnetic core shift register, particular cores of which are preset in accordance with the called subscriber substation information by means of digital keys. Operation of any of the digital keys to set a combination of cores at the same time activates a source of two-phase advance pulses to shift the information set into the register into an output circuit in the form of a particular coded sequence of electrical impulses.

The foregoing objects are realized and the features are embodied in one illustrative arrangement according to the principles of this invention which comprises an alternating series of storage and transfer cores. Each of the cores is coupled to a next succeeding core by means of a coupling loop comprising an output winding inductively coupled to one core and an input winding inductively coupled to the succeeding core. Each loop also includes a unidirectional current element. All of the cores have inductively coupled thereto an advance winding, the latter windings being connected together in series to form two advance current circuits: one for the storage cores and one for the transfer cores. By means of one or more second input, or setting windings, on each of the storage cores, the latter cores may be selectively preset to one condition of remanent magnetization. To accomplish this presetting operation, the setting windings are connected in a plurality of possible coding circuits, each circuit containing therein a manually operable key and a common current source. When a key designating an element of called information is operated on one of the circuits is selected and a setting current is applied to all of the setting windings present in that circuit. As a result the particular storage cores inductively coupled to the latter windings are set and the register is prepared to shift the information thus registered to an output circuit in the form of a sequence of impulses.

When a key is released after the operation which applies the current source to a particular coding circuit a switching means is simultaneously operated to trigger a source of alternating advance current pulses to operate the shift register in a well-known manner. Since only a selected combination of storage cores was set by the operation of a digital key, the last core of the shift register will not be reset upon each application of an advance pulse but only on occasion when the preceding transfer core by its own resetting had previously set the last core. An output pulse will then be induced in the output winding of the last core, and the output circuit of the generator, in the sequence in which the storage cores were preset.

Figure 2:
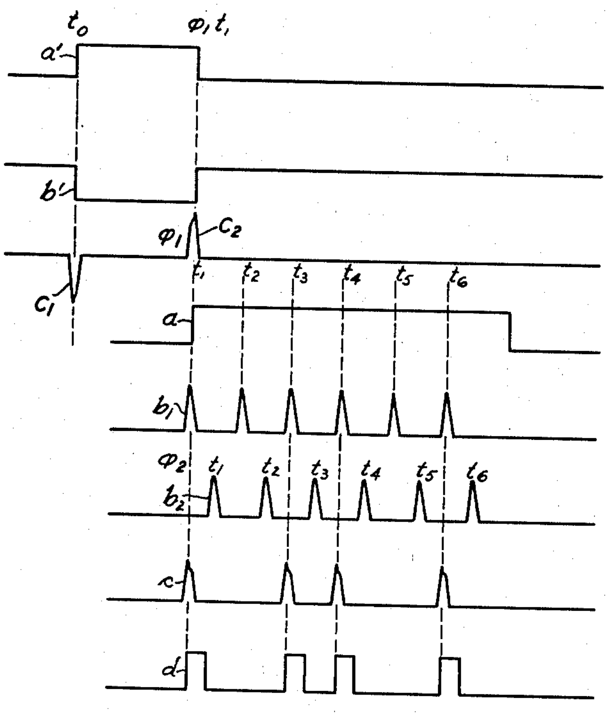
Figure 3:
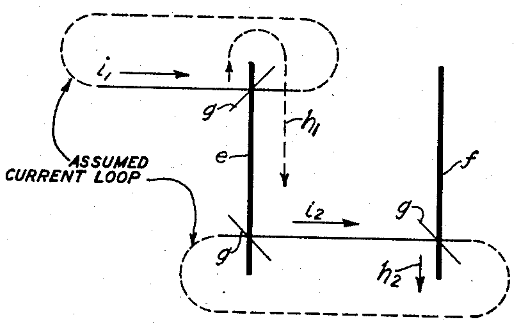

A complete understanding of the present invention together with additional objects and features thereof can be gained by a consideration of the detailed description which follows when taken in conjunction with the accompanying drawing in which:

Fig. 1 is a schematic presentation of an illustrative embodiment of this invention, Fig. 2 is a diagrammatic comparison of the approximate wave shapes and time relationship of various current pulses at designated points in the illustrative circuit of this invention, and Fig. 3 depicts the mirror symbol notation employed in the drawing to represent the circuit elements of one embodiment of this invention. The notation is that also employed by M. Karnaugh in his article "Pulse-Switching Circuits Using Magnetic Cores," Proceedings of the I. R. E., vol. 43, No. 5, May, 1955, pages 570 through 583, and is there described in detail.

Briefly, in this notation, as shown in Fig. 3, the magnetic cores are represented by heavy vertical lines *e* and *f* and the conductors by horizontal lines. The core windings are then represented by the short lines *g* intersecting the horizontal lines and cores at an angle of 45°. The representations *g* are termed "mirror" symbols and the direction of the angle corresponds to the sense of the winding with reference to the direction of current flow. When a current, such as $i_1$, flows in a conductor the direction of the resulting magnetic flux arising from the current in the winding is readily determined by "reflecting" the current in the winding "mirror" *g*. By projecting the flux lines so produced around the end of the core symbol *e*, as indicated by $h_1$, the direction of the current $i_2$ in the conductor connected to the other winding *g* of core *e* can be determined by "reflecting" the flux $n_1$ in the winding "mirror" *g*. The direction of the flux $h_2$ in the core *f* produced by the current $i_2$ is similarly determined by "reflecting" the current $i_2$ in the "mirror" *g* as indicated.

One illustrative impulse generator according to the principles of the present invention is shown in Fig. 1 of the drawing and is seen to comprise an alternating series of magnetic storage cores S1, S2, etc., and magnetic transfer cores T1, T2, etc. An output core O6 follows the last of the series of transfer cores. The magnetic cores are advantageously of the well-known ferrite or magnetic-tape type exhibiting a substantially rectangular hysteresis characteristic and are capable of remaining in either of two conditions of magnetic remanence to which switched by an applied magnetomotive force. Each of the storage and transfer cores and the output core is provided with an advance winding 10 and an output winding 11 inductively coupled thereto, and all of the cores except the first of the storage cores is also provided with an input winding 12. A coupling loop including a unidirectional current element 13 couples the output winding 11 of each of the cores to an input winding 12 of a next succeeding core. Each storage core is in this manner coupled to a transfer core and each transfer core is coupled to a storage core. The last of the series of transfer cores is similarly coupled to the output core O6 from which core the output from the circuit is taken through its output winding 11. The advance windings 10 of the storage cores and output core O6 are connected in series by means of a conductor 14 and the advance windings 10 of the transfer cores are similarly connected by a conductor 15.

In addition to the windings described, each of the storage cores has inductively coupled thereto one or more setting windings 16. Thus, for example, the cores S1 and O6 each have one setting winding 16 thereon and the core S4 has five such windings 16. A two phase advance pulse source 70 is connected by suitable output means to the conductors 14 and 15. The setting windings 16 of the storage cores S1 through S5 and output core O6 are interconnected in a manner such as to provide a plurality of possible circuits each one terminating in a source of potential 17. Ten such possible circuits, 21 through 30 are provided, each one being shown in Fig. 1 as sharing, for reasons of simplicity, common portions of other circuits. Each of the circuits 21 through 30 has included therein a pair of make springs forming the contacts 31 through 40, respectively, and each of the circuits 21 through 30 is connected to a common grounded bus 18. The circuit 21, for example, may thus be traced as follows: ground bus 18, make contacts 31, setting windings 16 of the storage cores S4, S2, and S5, and the output core O6, to potential source 17. Other circuits may be similarly traced, thus the circuit 30: ground bus 18, contacts 40, the setting windings of the storage cores S3, S4, S2 and S1, and the output core O6, to the potential source 17. It should be noted that for each operation of a key one and only one coding circuit is closed because the make contacts of none of the other possible coding circuits have been closed. The pairs of springs forming the make contacts 31 through 40 are manually and selectably operable by a plurality of keys 1 through 0, respectively. The keys 1 through 0 additionally control a plurality of pairs of break springs forming the contacts 41 through 50. The latter contacts are serially included in a circuit from ground to a conductor 51 connected to a multivibrator control means 60 which in turn is connected by means of a conductor 52 to the advance pulse source 70. An output pulse shaping means 80 is connected to the output winding 11 of the output core O6 through a unidirectional current element 13.

The advance pulse source 70, the control means 60, and the pulse shaping means 80 may each advantageously comprise one of the well-known transistor or electron tube multivibrator circuits producing a substantially rectangular output in the conventional manner and no detailed description of these circuits need here be provided.

Assume now for purposes of describing the operation of the impulse generator of Fig. 1 that all of the cores of the generator are initially in a "reset" magnetic condition, that is, in a magnetic condition regarded as downward when viewed in Fig. 1 of the drawing. Assume further that it is desired to transmit control impulses corresponding to the arbitrarily selected digit 7. The key 7 is operated in a downward direction as viewed in Fig. 1 thereby closing the make contacts 37 which in turn close the circuit 27 which may be traced as follows: ground bus 18, make contacts 37, the setting windings 16 of the storage cores S4, S3, and S1, and the output core O6, to the potential source 17. The storage cores, S1, S3, and S4, and output core O6 will thereby be "set" in a magnetic condition regarded as upward when viewed in Fig. 1 of the drawing. The operation of the key 7 is indicated in Fig. 2 as occurring at the time $t_0$ and the potential applied by the closure of the contacts 37 is represented as a pulse $a^1$.

Also under the control of the key 7 and simultaneously with the closing of the make contacts 37, break contacts 47 are opened. When the break contacts 47 reclose, the single-shot multivibrator 60 is operated and transfers conduction to its other stage in a well-known manner. The opening of the contacts 47 is indicated in Fig. 2 at the time $t_0$ as a negative going pulse $b^1$. The voltage pulses in the conductor 51 upon the opening of the break contacts 47 across the capacitor 61 and resistors 62 and 63 are shown in Fig. 2 as the pulses $C_1$ and $C_2$ occurring at the times $t_0$ and $\varphi_1 t_1$, respectively. An enabling voltage pulse shown in Fig. 2 as the pulse *a* is thereby applied from the output of the means 60 to the conductor 52 to enable the multivibrator advance pulse source 70 to operate. At this time the multivibrator advance pulse source 70 applies a series of $\varphi_1$ and $\varphi_2$ advance pulses, shown as $b_1$ and $b_2$ in Fig. 2, to the conductors 14 and 15 beginning at the times $\varphi_1 t_1$, and $\varphi_2 t_1$, respectively. Upon the application of the first $\varphi_1$ advance pulse $b_1$ to the conductor 14 serially connecting the advance windings 10 of the storage cores S1 through S5 and the output core O6, each of the latter cores which were previously set by the operation of the key 7 will be reset. Since the cores S1, S3, S4, and O6 were previously so set an output voltage will be induced in the output winding 11 of the output core O6 upon the application of the first $\varphi_1$ advance pulse $b_1$ and a current pulse *c* shown in Fig. 2 of the drawing will be applied through the unidirectional current element 13 to the pulse shaping multivibrator means 80 at the time $\varphi_1 t_1$.

By the application of the same advance pulse $b_1$ the previously set magnetic condition of the storage cores S1, S3 and S4 will be transferred via the coupling loops and unidirectional elements 13 to the transfer cores T1, T3, and T4 in the well-known manner of magnetic core shift registers generally. When the $\varphi_2$ advance pulse $b_2$ shown in Fig. 2 is applied to the conductor 15 and, thereby, the windings 10 of the transfer cores at the time $\varphi_2 t_1$, the transfer cores T1, T3, and T4 will be reset and the set condition will be transferred via the coupling loops and unidirectional current elements 13 to the storage cores S2, S4, and S5, again in the well-known shift register manner. Upon the second application of a $\varphi_1$ advance pulse $b_1$ to the conductor 14, the latter set conditions of the storage cores will be shifted to the transfer cores T2, T4, and T5, and, since the output core O6 had not been set by the last $\varphi_2$ advance pulse, no output pulse will at this time be applied to the pulse shaping means 80. The next $\varphi_2$ advance pulse $b_2$ applied to the conductor 15 will transfer the set conditions presently in the transfer cores to succeeding storage cores and the set condition present in the transfer core T5 will be shifted to the output core O6. Upon the third application of a $\varphi_1$ advance pulse $b_1$ the set conditions will be again shifted from the storage cores to the next succeeding transfer cores and at this time since the output core O6 was set an output pulse *c* will be induced in the output circuit including the output winding 11 of the output core O6. In a similar manner upon the alternate application of $\varphi_1$ and $\varphi_2$ advance pulses $b_1$ and $b_2$, respectively, the set conditions will be shifted along the register to set and reset the output core O6 in accordance with the particular coded digital information introduced into the register by the operation of the key 7. As a result a series of output pulses *c* is applied to the pulse shaping means 80 in accordance with coding of the particular storage cores set by the coding circuit 27 as controlled by the key 7. It should be noted that the enabling pulse *a* produced by the multivibrator control means 60 is of a duration sufficiently long to permit the advance pulse source 70 to apply $\varphi_1$ and $\varphi_2$ alternating advance pulses to the cores until all of the stored coded information has been shifted out of the register. In this case at least six $\varphi_1$ and six $\varphi_2$ advance pulses are applied to the conductors 14 and 15, respectively.

The output pulses applied to the pulse shaping means 80 are graphically illustrated in Fig. 2 of the drawing as the pulses *c*. It should be noted that in accordance with the coding representing the operation of digital key 7 a pulse *c* is applied to the pulse shaping means 80 at the times indicated in Fig. 2 as $\varphi_1 t_1$, $t_3$, $t_4$, and $t_6$. In a similar manner manual operation of any of the other digital keys 1 through 0 will cause a particular combination of the storage cores and, in each case, the output core O6, to be set. The pulse shaping single-shot multivibrator 80 operates in a conventional manner to produce a substantially rectangular output pulse in a form and, for this illustrative operation, in a sequence, shown in Fig. 2 as the pulses *d*. The pulses *d* may then be advantageously applied to the telephone control circuits to operate subsequent switching equipment.

Although any coding representative of a particular digit selected may be chosen, the setting windings 16 are interconnected by means of the circuits 21 through 30 to set combinations of cores in a manner corresponding to that represented in Table I. In representing the sequence of pulses *d* produced by the impulse generator of this invention the well-known binary notation in which a "1" represents an absence of an output signal at the times $\varphi_1 t_1$ through $\varphi_1 t_6$ is employed.

*Table I*

| Digit Keyed | Cores Set | $\varphi_1 t_1$ | Sequence of Output Pulses | | | | |
|---|---|---|---|---|---|---|---|
| | | | $t_2$ | $t_3$ | $t_4$ | $t_5$ | $t_6$ |
| 1 | 2, 4, 5, 6 | 1 | 1 | 1 | 0 | 1 | 0 |
| 2 | 2, 3, 5, 6 | 1 | 1 | 0 | 1 | 1 | 0 |
| 3 | 2, 3, 4, 6 | 1 | 0 | 1 | 1 | 1 | 0 |
| 4 | 2, 3, 4, 5, 6 | 1 | 1 | 1 | 1 | 1 | 0 |
| 5 | 1, 3, 5, 6 | 1 | 1 | 0 | 1 | 0 | 1 |
| 6 | 1, 3, 4, 5, 6 | 1 | 1 | 1 | 1 | 0 | 1 |
| 7 | 1, 3, 4, 6 | 1 | 0 | 1 | 1 | 0 | 1 |
| 8 | 1, 2, 4, 6 | 1 | 0 | 1 | 0 | 1 | 1 |
| 9 | 1, 2, 4, 5, 6 | 1 | 1 | 1 | 0 | 1 | 1 |
| 0 | 1, 2, 3, 4, 6 | 1 | 0 | 1 | 1 | 1 | 1 |

Other coding arrangements and sequences of output impulses may readily be realized by simply varying the particular setting windings connected in the individual coding circuits 21 through 30. However, specific requirements of the central office equipment employed to accept the control impulses generated may impose certain limitations on the variety of possible impulse sequences usable. Thus an electronic telephone switching system with which the impulse generator according to the present invention is readily adaptable would employ electronic scanning means to individually scan the subscriber lines on a time shared basis. Since synchronization of the operation of the scanning means and the impulse generator is not feasible for obvious reasons, it woud be difficult to detect the absence of an output signal, that is, a binary "0" in more than one consecutive time slot. Reference to Table I above shows that the coding applied in the illustrative embodiment described meets this situation and considerable timing difference between the impulse generator and the central office scanning equipment is thus permissible. Since the output core O6 is set for each digital coding an initial pulse is produced for each digit at the time $\varphi_1 t_1$ and this pulse may conveniently be used as a "start" pulse to indicate the beginning of a series of coded control impulses.

Although the particular combinations of storage cores are set by means of interconnecting a plurality of setting windings on the storage cores, the selection of storage cores could as readily have been accomplished by providing only a single setting winding for each of the storage cores and selecting the particular cores to be set by means of a suitable combination of spring contacts associated with each of the digital keys 1 through 0. Further, the interconnection of the setting windings 16 is to be understood as representing, from the viewpoint of the minimum number of setting windings 16 required to perform the selective setting operation, the more advantageous arrangement. It is to be understood, however, that each of the coding circuits 21 through 30 could have separate and individual windings 16 included therein for the particular combination of storage cores controlled by the coding circuit.

The impulse generator described herein is readily adaptable to modification to suit specific system requirements. Thus, for example, by the addition of a stage including a storage core and a transfer core to the generator and an eleventh coding circuit and key, additional coded impulses may be produced. These additional impulses by their presence could be utilized to indicate that all of the called subscriber directory information has been introduced into the generator. By their coded sequence such additional impulses could at the same time be used to identify the one of a plurality of parties initiating the call.

Other modifications and changes may similarly be made in the organization and structure of the illustrative embodiment of this invention as described herein. Accordingly it is to be understood that the above-described arrangements are illustrative of the application of the principles of the invention. Numerous other arrangements in addition to those suggested may be devised by those skilled in the art without departing from the spirit and scope of the invention.

What is claimed is:

1. An electrical circuit comprising a first and a second plurality of magnetic cores having two magnetic conditions, input, output, and advance windings for each of said cores, means for individually coupling the output windings of said first plurality of cores and the input windings of said second plurality of cores, first circuit means for serially connecting the advance windings of said first plurality of cores, means for setting a particular combination of cores of said first plurality of cores in one of said magnetic conditions in accordance with a predetermined code comprising a setting winding on each core of said particular combination of cores, second circuit means for serially connecting said setting windings, and means for applying a setting current to said second circuit means; and means for applying an advance current to said first circuit means to switch said cores of said particular combination of cores to the other of said magnetic conditions.

2. An electrical circuit comprising a first and a second plurality of magnetic cores having two magnetic conditions, input, output, and advance windings for each of said cores, means for individually coupling the output windings of said first plurality of cores and the input windings of said second plurality of cores and the output windings of said second plurality of cores and the input windings of said first plurality of cores, first circuit means for serially connecting the advance windings of said first plurality of cores, second circuit means for serially connecting the advance windings of said second plurality of cores, means for setting a particular combination of cores of said first plurality of cores in one magnetic condition in accordance with a predetermined code comprising a setting winding on each core of said particular combination of cores, third circuit means for serially connecting said setting windings, and means for applying a setting current to said third circuit means; and means for alternately applying advance currents to said first and said second circuit means to alternately transfer said one magnetic condition from said particular combination of cores of said first plurality of cores to a corresponding combination of cores of said second plurality of cores and from said last-mentioned cores to a succeeding corresponding combination of cores of said first plurality of cores.

3. An electrical circuit comprising a first and a second plurality of magnetic cores, means including an output and an input winding for each of said cores for alternately coupling said first plurality of cores with said second plurality of cores and said second plurality of cores with said first plurality of cores, advance windings for each of said cores, setting windings for each of said first plurality of cores, a plurality of circuits each including the setting windings of different ones of said first plurality of cores, means for selectively applying a setting current to a particular one of said circuits, and means for alternately applying advance currents to the advance windings of said first plurality of cores and to the advance windings of said second plurality of cores.

4. An electrical circuit comprising a first and a second plurality of magnetic cores, input, output, setting, and advance windings for each of said cores, a plurality of first circuit means for connecting the output windings of each of said first plurality of cores and the input windings of each of said second plurality of cores, and for connecting the output windings of each of said second plurality of cores and the input windings of each of said first plurality of cores, each of said first circuit means including a unidirectional current element, second circuit means for connecting the advance windings of each of said first plurality of cores in series, third circuit means for connecting the advance windings of each of said second plurality of cores in series, a plurality of fourth circuit means for connecting the setting windings of different combinations of cores of said first plurality of cores in series, first switching means including a current source for selectively applying a setting current to a predetermined one of said fourth circuit means for setting a particular combination of cores of said first plurality of cores in one magnetic condition, and second switching means including a current source for alternately applying advance current to said second and third circuit means.

5. An electrical circuit as claimed in claim 4 also comprising means operated responsive to the operation of said first switching means for operating said second switching means.

6. A coded pulse generator comprising a plurality of storage cores and a plurality of transfer cores, each of said cores being capable of storing a bit of binary information in the form of one or another magnetic condition, input, output, setting, and advance windings for each of said cores, a plurality of coupling means for connecting the output windings of each of said storage cores to the input winding of a transfer core and the output windings of each of said transfer cores to the input winding of a storage core, a first and a second circuit means for serially connecting the advance windings of said storage cores and said transfer cores, respectively, a plurality of third circuit means for serially connecting the setting windings of predetermined combinations of storage cores, means for selectively applying a setting current to one of said third circuit means to store a particular bit of binary information in each core of one of said predetermined combinations of storage cores, and means for applying an advance current to said first circuit means to shift said information bits to a corresponding combination of transfer cores.

7. A coded pulse generator as claimed in claim 6 in which said last-mentioned means also comprises means for subsequently applying an advance current to said second circuit means to again shift said information bits to a succeeding corresponding combination of storage cores.

8. A coded pulse generator comprising a series of alternating storage and transfer cores, each of said cores having two magnetic conditions, circuit means including output and input windings for each of said cores for coupling adjacent cores of said series of cores, setting windings inductively coupled to each of said storage cores, a plurality of circuit means each including particular ones of said setting windings, means for selectively applying a setting current to one of said circuit means, said particular setting windings being connected in said last-mentioned circuit means in a manner such as to set the inductively coupled storage cores in one magnetic condition in a particular sequence in accordance with a predetermined code, output circuit means connected to the last of said storage cores, and means including an advance winding for each of said cores for alternately applying advance currents to said storage and transfer cores.

9. A coded pulse generator comprising an alternating series of storage and transfer cores, an output, an advance, and a first input winding on each of said cores, coupling means including a unidirectional current means for individually connecting the output windings of each core to a first input winding of an adjacent core, first and second circuit means for serially connecting the advance windings of said storage and transfer cores, respectively, second input windings for each of said storage cores, a current source, a plurality of switching means for selectively connecting said current source to particular ones of said second input windings to set particular ones of said storage cores in accordance with a predetermined code, and means for alternately applying advance currents to said first and second circuit means.

10. A coded pulse generator comprising an alternating series of storage and transfer cores, each of said cores having a first and a second magnetic state, an output, an advance, and a first input winding for each of said cores, a plurality of coupling means each including a unidirectional current means for individually connecting the output winding of each core to the first input winding of an adjacent core, first and second circuit means for serially connecting the advance windings of said storage and transfer cores, respectively, a second input winding for each of said storage cores, means for introducing a predetermined sequence of said first magnetic states in said storage cores comprising a current source and a plurality of manually operated switching means for selectively connecting said current source to particular ones of said second input windings in accordance with a predetermined code, and means for alternately applying advance currents to said first and second circuit means for shifting said sequence of first magnetic states along said series of storage and transfer cores.

11. A coded pulse generator as claimed in claim 10 also comprising means responsive to said switching means for controlling said last-mentioned means.

12. A coded pulse generator comprising an alternating series of storage and transfer cores, said cores being capable of switching from a first to a second magnetic condition, an output, an advance, and a first input winding for each of said cores, a plurality of coupling means each including a unidirectional current means for individually connecting the output winding of each core to the first input winding of an adjacent core, first and second circuit means for serially connecting the advance windings of said storage and transfer cores, respectively, a second input winding for each of said cores, means for setting particular ones of said storage cores in a predetermined sequence of said first magnetic conditions in accordance with a predetermined code comprising a current source and a manually operated switching means for connecting said current source to the second input windings of said particular storage cores, and means for alternately applying advance currents to said first and second circuit means for successively switching said cores from said first to said second magnetic condition to thereby successively induce currents in said output windings in said predetermined sequence.

13. A coded pulse generator as claimed in claim 12, also comprising output circuit means connected to the output winding of the last core of said alternating series of cores, said successive switching of said last core inducing output currents in said output circuit means in said predetermined sequence.

14. A coded pulse generator as claimed in claim 13, in which said manually operated switching means comprises a plurality of digital keys.

15. A coded pulse generator as claimed in claim 14 in which said manually operated switching means also comprises means for simultaneously energizing said means for alternately applying advance currents to said first and second circuit means.

16. In a telephone subscriber subset, means for transmitting coded impulses comprising a first plurality of magnetic cores, setting windings on each of said cores, a current source, a plurality of circuit means, each including the setting windings of particular ones of said first plurality of cores, a plurality of switching means for selectively connecting said current source to one of said plurality of circuit means to set particular ones of said first plurality of cores representative of digital calling information in accordance with a predetermined code, a second plurality of magnetic cores, means including an output and an input winding for each of said cores for coupling each of said first plurality of cores to a core of said second plurality of cores, and means responsive to the operation of said switching means and including advance windings on each of said cores for applying an advance current to said cores of said first plurality of cores to shift said coded information to said second plurality of cores.

17. In a telephone subscriber subset, means for transmitting coded impulses comprising a plurality of storage cores, a plurality of transfer cores, an output core, each of said cores having two conditions of remanent magnetization, output, input, and advance windings for each of said cores, coupling circuit means for connecting the output windings of each of said storage cores to the input winding of a transfer core, the output winding of each of said transfer cores to the input winding of a storage core and the output winding of the last of said plurality of transfer cores to the input winding of said output core, an output circuit connected to the output winding of said output core, setting windings for each of said storage and output cores, a potential source, a plurality of digital keying means, coding means operable responsive to the operation of selected ones of said keying means for serially connecting the setting windings of different combinations of said storage and output cores to said potential source to set particular combinations of said last-mentioned cores in one condition of remanent magnetization, and means including an advance current source for applying advance currents to the advance windings of said storage and output cores to switch said storage and output cores of said particular combinations and induce output signals in the output windings of said last-mentioned cores.

18. In a telephone subscriber subset, the combination according to claim 17, in which said coding means comprises a plurality of circuits, each of said circuits including contacting means controlled by one of said plurality of digital keying means.

19. In a telephone subscriber subset, the combination according to claim 18, also comprising switching means operable responsive to the operation of any of said digital keying means and means for enabling said advance current source responsive to the operation of said switching means.

20. In a telephone subscriber subject, the combination according to claim 19, also comprising pulse shaping means connected to said output circuit.

21. In a telephone subscriber subset, the combination according to claim 20, also comprising means also including said advance current source for applying advance currents to the advance windings of said transfer cores.

No references cited.